United States Patent [19]

Huck et al.

[11] Patent Number: 5,445,469
[45] Date of Patent: Aug. 29, 1995

[54] SLIDING JOINT ASSEMBLY FOR TWO PARTS SUBJECTED TO LARGE MECHANICAL AND THERMAL STRESSES

[75] Inventors: André Huck, St Just; Dominique Indersie, Vernon, both of France

[73] Assignee: Societe Europeenne De Propulsion, Suresnes, France

[21] Appl. No.: 166,918

[22] Filed: Dec. 15, 1993

[30] Foreign Application Priority Data

Dec. 30, 1992 [FR] France ................... 92 15956

[51] Int. Cl.⁶ .............................................. F16B 2/02
[52] U.S. Cl. ...................................... 403/30; 403/338; 403/24; 60/39.32
[58] Field of Search ................ 403/28, 29, 30, 24, 403/41, 335, 336, 337, 338; 60/39.32; 416/241 B

[56] References Cited

U.S. PATENT DOCUMENTS

| | | |
|---|---|---|
| 2,404,447 | 7/1946 | Marancik et al. . |
| 2,457,073 | 12/1948 | Stearns . |
| 3,361,452 | 1/1968 | Holister . |
| 3,549,178 | 12/1970 | Flink . |
| 3,965,066 | 6/1976 | Sterman et al. ............... 60/39.32 |
| 4,447,966 | 5/1984 | Mollenkopf et al. ............ 403/28 X |
| 4,632,634 | 12/1986 | Vinciguerra et al. .......... 403/338 X |
| 4,909,743 | 3/1990 | Bouiller et al. ............... 60/39.32 X |
| 4,921,401 | 5/1990 | Hall et al. .................... 403/28 X |
| 5,074,697 | 12/1991 | Blanpain et al. . |
| 5,249,877 | 10/1993 | Corsmeier ..................... 403/30 X |
| 5,273,249 | 12/1993 | Peterson et al. ............... 60/39.32 X |

FOREIGN PATENT DOCUMENTS 1507075  4/1978  United Kingdom .

Primary Examiner—Randolph A. Reese
Assistant Examiner—Harry C. Kim
Attorney, Agent, or Firm—Bacon & Thomas

[57] ABSTRACT

The sliding joint assembly for a first part and a second part having different expansion coefficients comprises a plurality of radially-acting spring blades connected firstly at first ends to the first part only in the vicinity of a contact interface, and secondly via second ends to the second part only in a zone that is axially remote from the contact interface, the contact interface constituting a sliding contact interface between the first and second parts while the second ends of the spring blades are connected to the second part by mechanical fasteners constituted by detachable screw-and-nut type assemblies provided with spring washers for damping forces exerted in the axial direction.

11 Claims, 5 Drawing Sheets

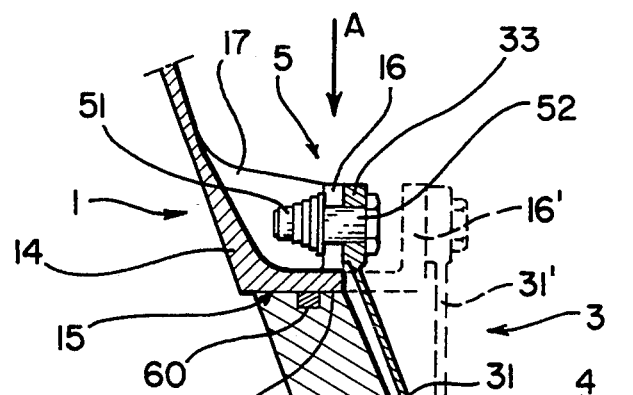
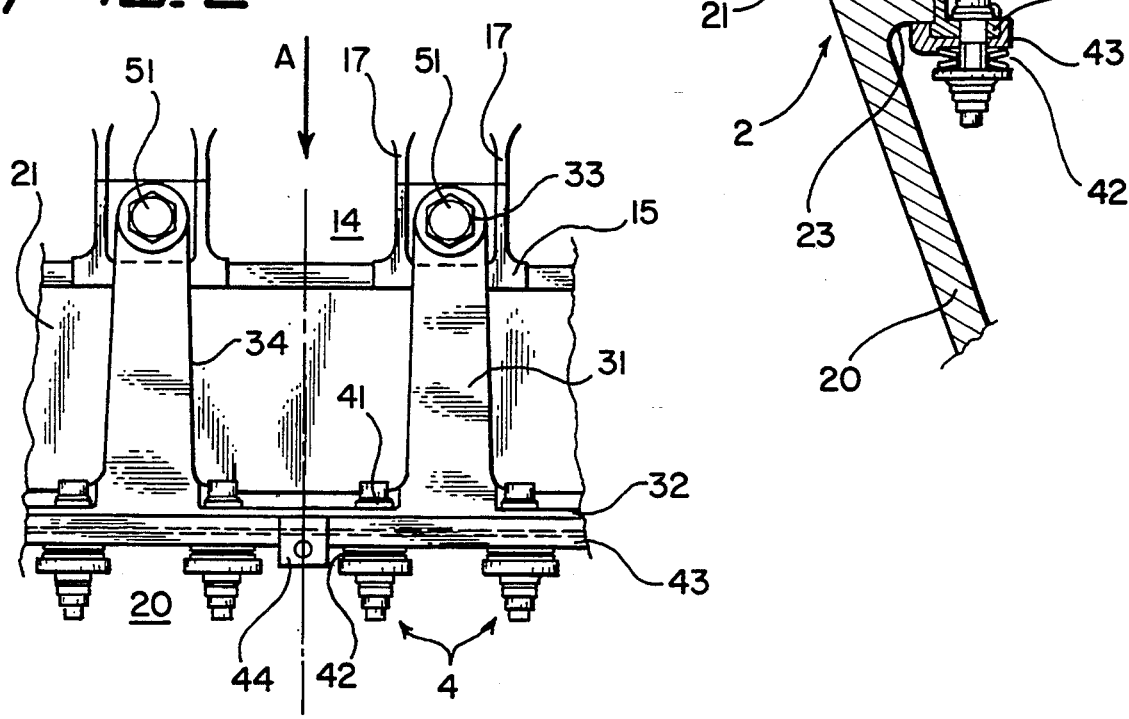
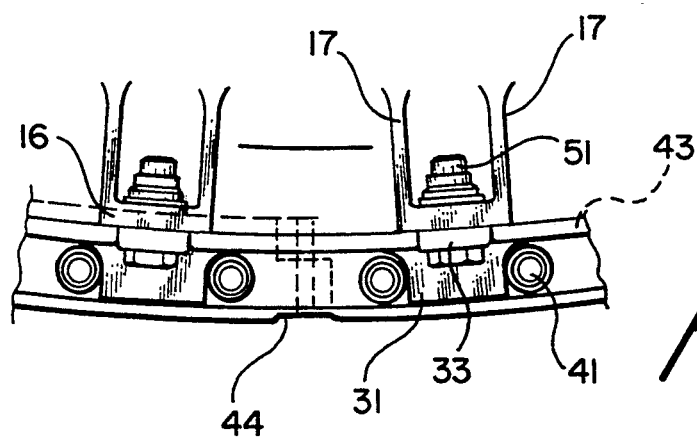

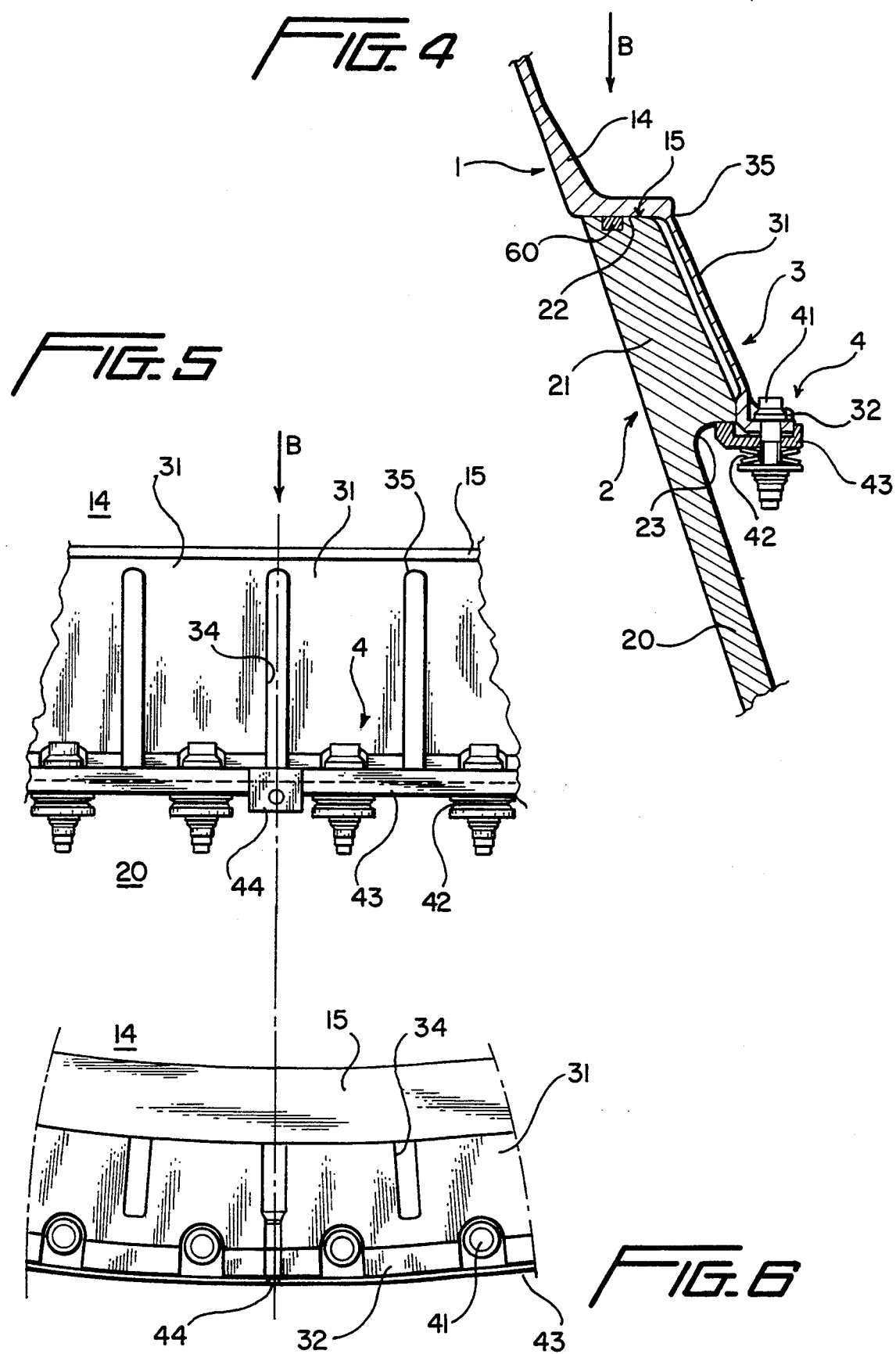

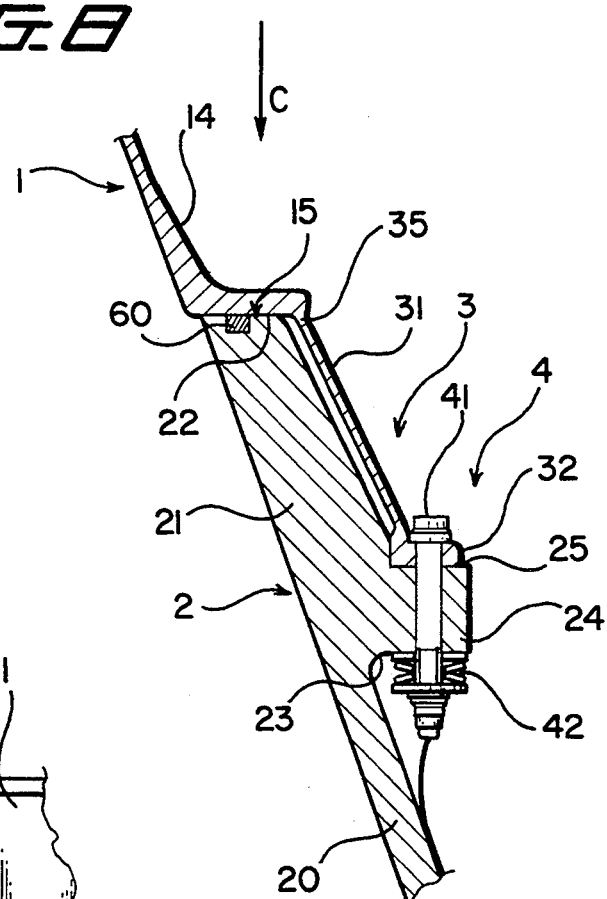
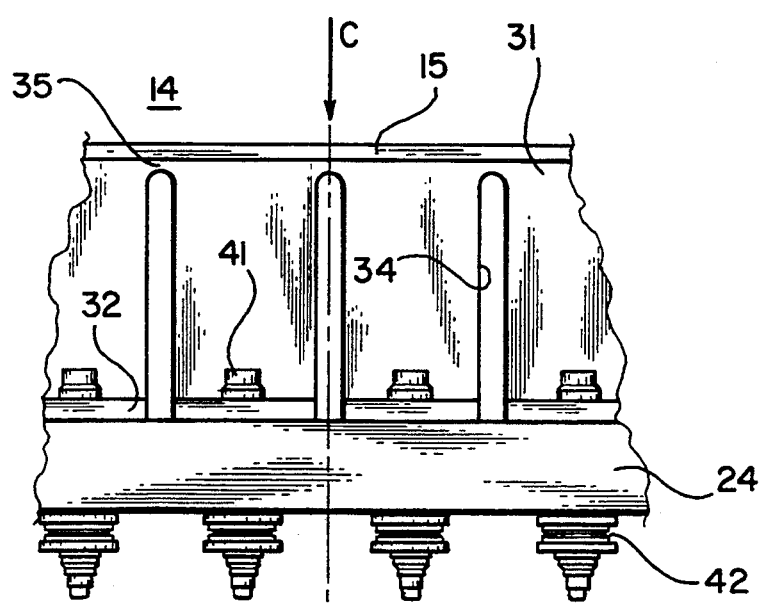
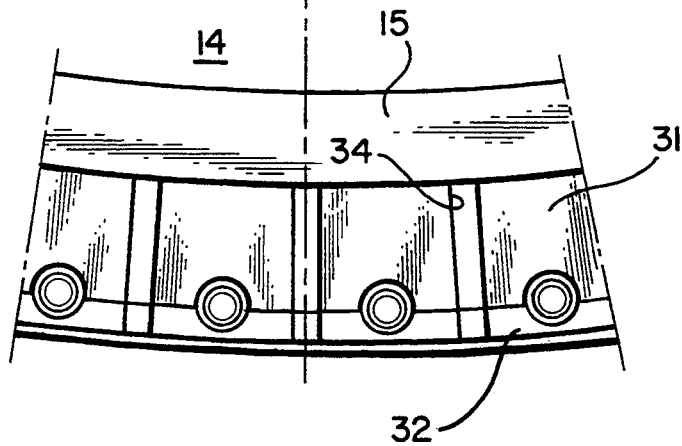

SLIDING JOINT ASSEMBLY FOR TWO PARTS SUBJECTED TO LARGE MECHANICAL AND THERMAL STRESSES

FIELD OF THE INVENTION

The present invention relates to a sliding joint assembly for a first part and a second part that have different expansion coefficients, and that are subject to large mechanical and thermal stresses, including at least one substantially radial contact interface, a sealing gasket disposed at said contact interface, and mechanical fastening means between the first and second parts.

The invention is particularly applicable to the field of propulsion in the air or in space.

PRIOR ART

Various examples are known of joint devices between two parts having different coefficients of expansion and subjected to large mechanical and thermal stresses.

Such joint devices are necessary, in particular, for assembling circularly symmetrical parts of large section that are made of materials which are very different, e.g. a part made of a metal and a part made of a material that is a composite or a ceramic.

In a first example of a known joint device, as shown in FIG. 12, a circularly symmetrical part 101 having a large coefficient of thermal expansion, and a circularly symmetrical part 102 having a smaller coefficient of thermal expansion are assembled together by means of a set of bolts 104 extending parallel to the axis of the parts 101 and 102. The shanks 142 of the bolts 104 pass through oblong holes 116 formed in a radial flange 114 on the first part 101 that makes contact via an interface 115 provided with a sealing gasket 160 with the top surface 122 of a radial flange 121 formed at the top end of the second part 102. The heads 141 of the bolts 104 bear against the outside top face of the radial flange 114, while the nuts 143 engaged on the shanks 142 of the bolts bear via plane washers 145 against the bottom face 123 of the radial flange 121 of the second part 102. The presence of the oblong holes 116 formed through the radial flange 114, and also of the clearance 117 in the event that the interface 115 between the parts 101 and 102 has a step, ought theoretically to allow a certain amount of sliding to take place in the radial direction at the interface 115 between the parts 101 and 102. In practice, the clamping force applied by the bolts 104 in the axial direction is very great, so that friction is very high, and as a result the amount of sliding that can take place at the interface 115 is insufficient, thereby giving rise to excessive stresses in the assembled-together parts 101 and 102. Given the axial clamping forces exerted, any improvement in the sliding at the interface 115 would require special coatings to be implemented on the surfaces that make contact at the interface 115, and that is difficult to do.

Another example of a known joint is shown in FIG. 13, where a circularly symmetrical part 102 having a large coefficient of expansion and a circularly symmetrical part 102 having a small coefficient of expansion are assembled together by means of radial pegs 204 passing through an axially directed flange 221 formed on one of the two parts to be assembled together, e.g. the part 202, and engaging with radial clearance in a complementary recess 216 formed in an end of the other part 201 and acting as a coupling fork, a sealing gasket 260 being disposed close to the flange 221 and in an interface 215 between the two parts 201 and 202. Such a structure does indeed allow relative displacement to take place radially between the two parts 201 and 202. However, in practice, assembling the joint device is difficult, particularly with large-diameter parts, since small errors in alignment between the radial pegs 204 and the holes formed through the flange 221 give rise to damaging stresses on the part 202. This type of joint is thus ill-adapted to parts that are subjected to large axial loads. In addition, assembly as a whole is generally quite difficult to perform.

OBJECTS AND BRIEF DESCRIPTION OF THE INVENTION

An object of the invention is to remedy the above-mentioned drawbacks and to enable parts having very different coefficients of expansion to be assembled together conveniently and reliably even if they are of large size, are subjected to large axial mechanical loads or to vibration phenomena, and are placed in thermal environments that give rise to large amounts of differential expansion.

These objects are achieved by a sliding joint assembly for a first part and a second part that have different expansion coefficients, and that are subject to large mechanical and thermal stresses, the assembly including at least one substantially radial contact interface, a sealing gasket disposed at said contact interface, and mechanical fastening means between the first and second parts, comprising a plurality of radially acting spring blades connected firstly via first ends to the first part only in the vicinity of said contact interface, and secondly via second ends to the second part only in a zone that is axially remote from said contact interface, said contact interface constituting a sliding contact surface between the first and second parts, while the second ends of the spring blades are connected to the second part via said mechanical fastening means constituted by detachable screw-and-nut type assemblies provided with spring washers for damping forces exerted in the axial direction.

In a first particular embodiment, the spring blades are connected to the first part via radial screw connections acting on flanges secured to the first part and formed perpendicularly to said contact interface.

In a second particular embodiment, the spring blades are connected to the first part by weld fillets formed in the vicinity of said contact interface.

In a third particular embodiment, the spring blades are integral with the portion of the first part that defines said contact interface.

The spring blades may be constituted by narrow individual blades leaving empty gaps between one another, the gaps being of width greater than the width of the spring blades.

However, the spring blades are preferably, constituted by a single skirt that is split so as to form narrow empty gaps between the spring blades, the gaps being narrower than the spring blades.

In a particular embodiment, the detachable screw-and-nut type assemblies provided with resilient washers serve to connect the second ends of the spring blades to a segmented ring assembled together by means of radial pegs and made of a material that has an expansion coefficient close to that of the second part, and that bears against the bottom face of a flange formed on said second part.

In another particular embodiment, said detachable screw-and-nut type assemblies provided with resilient washers connect the second ends of the spring blades with a flange formed directly on the second part.

The joint assembly of the invention is particularly well applied to assembling a first part made of a metal with a second part made of a material that is a composite or a ceramic.

The assembled-together parts may be first and second circularly symmetrical parts that are superposed axially.

The assembly of the invention is advantageously applied to assembling a divergent nozzle portion to a combustion chamber of a rocket engine.

In general, the joint assembly of the invention makes it possible to ensure that adequate sliding takes place between the assembled-together parts at an interface that may be defined by surfaces having high coefficients of friction, whereas by virtue of the use of spring blades that act radially, the mechanical joint means constituted by detachable screw-and-nut type assemblies can be situated remotely from the sliding contact interface in a low-expansion zone.

The presence of spring washers in the detachable screw-and-nut type assemblies makes it possible to take up axially-generated differences in expansion together with the axial stresses of the system, while also making it possible to accommodate variations within dispersion due to tolerances and to provide accurate control of the applied clamping force.

BRIEF DESCRIPTION OF THE DRAWINGS

Other characteristics and advantages of the invention appear from the following description of particular embodiments, given by way of non-limiting example and made with reference to the accompanying drawings, in which:

FIG. 1 is an axial half-section through a first embodiment of a joint assembly of the invention;

FIG. 2 is a view of the righthand side of a portion of the joint assembly shown in FIG. 1;

FIG. 3 is a plan view seen looking along arrow A of the joint assembly of FIGS. 1 and 2;

FIG. 4 is an axial half-section view showing a second embodiment of a joint assembly of the invention;

FIG. 5 is a view of the righthand side of a portion of the joint assembly of FIG. 4;

FIG. 6 is a plan view seen looking along arrow B of the joint assembly of FIGS. 4 and 5;

FIG. 8 is an axial half-section showing a third embodiment of a joint assembly of the invention;

FIG. 9 is a righthand side view of a portion of the FIG. 8 joint assembly;

FIG. 10 is a plan view seen looking along arrow C of the joint assembly of FIGS. 9 and 10;

DETAILED DESCRIPTION OF PARTICULAR EMBODIMENTS

Figure 7:
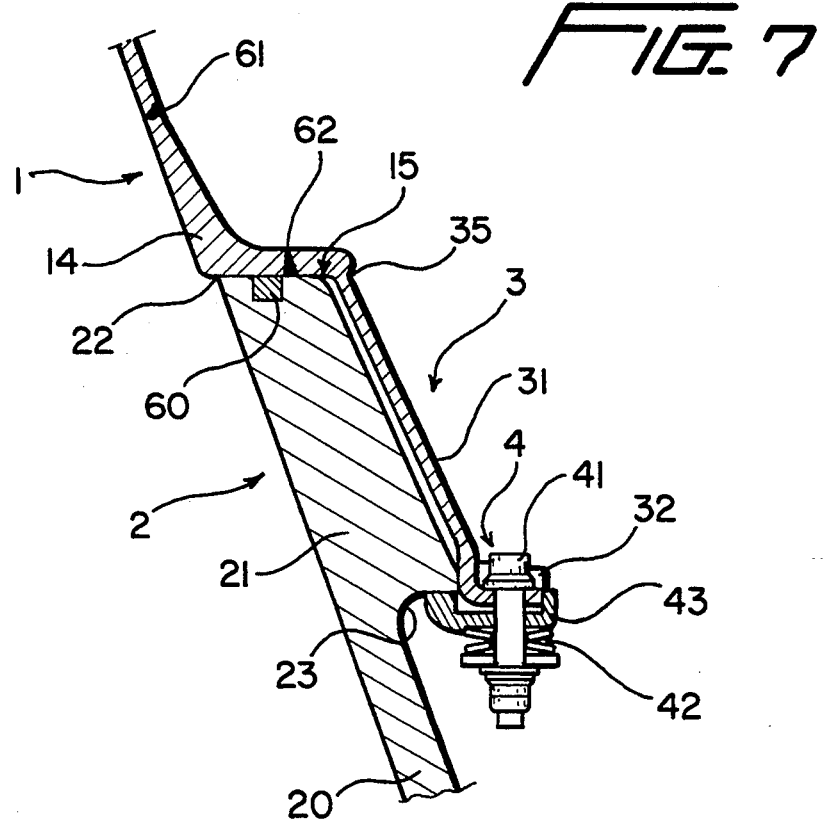
FIG. 7 is a view analogous to FIG. 4 and relates to a variant embodiment.

Reference is made initially to FIGS. 1 to 3 which show a first possible embodiment of the joint assembly of the invention as applied by way of non-limiting example to a rocket engine.

FIG. 1 thus shows a first circularly symmetrical part 1 made of metal which in this example is constituted by the bottom portion of a rocket engine combustion chamber, surmounting a second circularly symmetrical part 2 in axial alignment therewith and constituted in this case by the diverging portion of the rocket engine nozzle.

More particularly, FIG. 1 shows a first part 1 comprising an essentially frustoconical diverging portion 14 that forms a portion of the wall of the rocket engine nozzle and that is terminated at its downstream end by an outwardly directed and essentially radial flange that makes contact with a top surface 22 of a reinforced top portion 21 that constitutes a flange on the second circularly symmetrical part 2 which is likewise essentially frustoconical and has a wall 20 of smaller thickness downstream from the joint assembly.

In the example shown, the part 2 is made of a composite material such as a ceramic matrix composite (CMC) which has a coefficient of expansion that is about five times smaller than the coefficient of expansion of the first part 1 made of metal. Under the effect of the intense heat that prevails inside the nozzle portion defined by the parts 1 and 2, differential expansion between the two parts 1 and 2 tends to give rise to deformation in the radial direction that is greater for the part 1 made of metal than it is for the part 2 made of CMC. For circularly symmetrical parts 1 and 2 having a diameter greater than one meter, the differential deformation may be of the order of several millimeters.

The joint assembly of the invention enables the parts 1 and 2 to slide radially relative to each other at an interface 15 without generating forces that could lead to damaging stresses in the parts 1 and 2 or in the joint assembly itself.

FIGS. 1 to 3 show a first embodiment of a sliding joint assembly between the parts 1 and 2 having greatly differing expansion coefficients.

In this first embodiment, the parts 1 and 2 are assembled together by means of a segmented ring 43 whose various segments are assembled together by means of radial pegs 44, and which bears against a bottom surface 23 of the reinforced portion 21 of the second part 2. The ring 43 is made of a material whose expansion characteristics are close to those of the second part 2, so that the contact that exists at the interface between the surface 23 of the part 2 and the ring 43 slides little, regardless of temperature.

According to an essential characteristic of the present invention, the joint assembly comprises a plurality of spring blades 31 that act radially and that are disposed essentially axially or, more particularly, parallel to the frustoconical outside peripheral surface of the reinforced portion 21. The spring blades 31 are attached to the first part 1 at their top ends 33 in the vicinity of the contact interface 15, and they are attached to the second part 2 at their bottom ends 32.

More particularly, in the embodiment of FIGS. 1 to 3, the ends 33 of the spring blades 31 are attached to the first part 1 by means of radially-extending screws 5 that act against flange sectors 16 connected by means of radial reinforcing ribs 17 to the body of the part 1, the flange sectors 16 extending perpendicularly to the contact interface 15. By way of example, the radial screw connections 5 may comprise nuts 51 that are embedded or mounted by means of a rotary locking system on the inside of each flange sector 16. During assembly, threaded radial shanks 52 are then screwed directly into the nuts 51.

The ends 32 of the spring blades 31 are themselves connected to the second part 2 by mechanical connection means 4 which essentially comprise detachable screw-and-nut type assemblies 41 provided with spring washers 42 for controlling the forces that are exerted in the axial direction.

More particularly, in the structure shown in FIGS. 1 to 3, the detachable screw-and-nut type assemblies 41 provided with resilient washers 42 serve to connect the bottom ends 32 of the spring blades 31 with the segmented ring 43 that is assembled by means of the radial pegs 44 and that bears against the bottom face 23 of the flange 21 formed on the part 2.

In the example of FIGS. 1 to 3 as applied to a rocket engine, the spring blades 31 serve to take up the thermal expansion of the metal part 1 while the engine is in operation. After the part 1 has expanded, the spring blades 31 take up a new position as shown by dashed lines in FIG. 1 and as designated by reference 31', the new position of the flange sectors 16 being similarly designated by reference 16'.

The spring blades 31 may be constituted by individual plates or by plates that are connected together at at least one of their ends 32 or 33 so as to form a crown-shape. The spring blades 31 may be made out of various different materials. By way of example, alloys of the following types have the necessary mechanical strength: Inconel 718 (NC19FeNb), Incoloy 909, or A286 (EZ6 NCT 25-15).

The spring washers 42 serve to take up the axial displacements generated by the differential expansions, when the flexible spring blades 31 rotate and by the various axial stresses on the system. The spring washers 42 also serve to accommodate dispersions due to manufacturing tolerances and to provide accurate control on the clamping force that is applied.

In general, in operation, the lower flange constituted by the segmented ring 43 and the mechanical connection means 4 constituted by the fixing screws 41 and by the spring washers 42 all remain in substantially sliding-free contact with the part 2 because the ring 43 is made of a material whose expansion characteristics are close to those of the part 2.

The radial sliding between the parts 1 and 2 takes place solely at the top of the reinforced portion 21 of the part 2, at the interface 15. This radial sliding is facilitated by the spring blades 31 connected to the part 1 reducing the forces that are exerted at the interface 15.

The axial transmission of the radial displacement of the part 1 is taken up by the spring washers 42 via the spring blades 31.

It may be observed that the structure of the joint assembly of the invention is particularly simple and is easily adapted to different types of part 1 and 2 and to axial forces or to differential expansion forces that are different. It suffices merely to adapt dimensions, particularly in the axial direction of the reinforced portion 21 of the part 2 which defines lower and upper contact surfaces 23 and 22, and to adapt the characteristics of the spring blades 31, i.e. for them to be made of an appropriate material and for their number, dimensions, and shape likewise to be appropriate.

FIGS. 4 to 6 show a second embodiment of the invention which, for convenience of description, likewise relates to a connection between a part 2 constituting a CMC diverging portion for a rocket engine and a metal part 1 constituting the bottom portion of a combustion chamber. Nevertheless, the joint device of the invention is applicable to a joint between other types of part having a large amount of differential expansion and subjected to large mechanical and thermal stresses.

The device shown in FIGS. 4 to 6 is adapted to parts 1 and 2 having the same shape as the parts shown in FIGS. 1 to 3, and they are not described again.

However, in this case, the spring blades 31 are made from a single flared frustoconical skirt that is subdivided into spring blades 31 proper by narrow gaps 34, the width of the gaps being less than the width of the remaining portions that constitute the spring blades 31. In contrast, FIGS. 2 and 3 show empty gaps 34 between the spring blades 31 that are greater in width than the blades 31, even though that is not absolutely essential, even when using individual spring blades.

In the embodiment of FIGS. 4 to 6, the continuous upper ring 35 of the flared frustoconical skirt defining the spring blades 31 is integrally formed with the metal part 1. The spring blades 31 are thus machined at the same time as the part 1, and the connection 5 previously implemented by means of radial screws or pegs 51 as shown in FIGS. 1 to 3 is omitted, thereby simplifying implementation and reducing costs.

The spring blades 31 of the embodiment of FIGS. 4 to 6 perform the same function as the spring blades 31 of the embodiment of FIGS. 1 to 3.

As in the embodiment of FIGS. 1 to 3, the joint assembly shown in FIGS. 4 to 6 defines an interface 15 between the parts 1 and 2 where differential radial sliding takes place under the control of the radially-acting spring blades 31, and sealing is maintained between the two parts 1 and 2 by means of a gasket 60. At the bottom end 23 of the portion 21 of the part 2 that is of radially-increased thickness, screw-and-nut type connections 41 and spring washers 42 serving inter alia to control the clamping of the screws 41 act on the segmented ring 4 to hold the bottom ends 32 of the spring blades 31 close to the bottom surface 23 by means of a connection that remains practically stationary in operation. The joint assembly thus defines a single friction surface at the interface 15 that is vertically offset relative to the screw fastening means 4.

FIG. 7 shows a variant embodiment in which the top portions of the spring blades 31 are neither fastened to the part 1 by screw connections, nor are they integral with the part 1. In this variant embodiment, the spring blades 31 which are constituted by a split frustoconical skirt having a continuous portion 35 interconnecting the top ends of the blades 31 are themselves fastened to the part 1 by welding or by soldering.

The continuous portion 35 of the skirt defining the spring blades 31 may be welded to the bottom portion 14 of the part 1 in a zone 62 situated in the vicinity of the interface 15. It may be observed that implementing an annular weld fillet between the end of the part 1 and the continuous portion 35 of the set of spring blades 31 minimizes deformation during welding.

When the spring blades 31 and the lower portion 14 of the part 1 in contact with the surface 22 of the part 2 form a single piece, the part 1 can nevertheless be made up of two separate elements that are welded together in a zone 61 shown in FIG. 7.

It is thus possible to use a first type of alloy for the nozzle-defining top portion and a second type of alloy for the bottom portion that forms a flange which slides on the surface 22 of the part 2, and which also defines the spring blades 31. Whether welding takes place in the zone 61 or in the zone 62, it is possible to use a first type of material for the spring blades 31 that imparts the desired mechanical strength and flexibility thereto for the purpose of absorbing radial displacements, and to adopt a second type of material for the part 1 that is specifically adapted to making the nozzle.

FIGS. 8 to 10 show another embodiment which differs from the embodiment of FIGS. 4 to 6 essentially by the means 4 used for fastening the bottom ends 32 of the spring blades 31. The top ends of the spring blades 31 are not described in detail again and they may be in the form of a split conical skirt integrally formed with the part 1.

In the embodiment of FIGS. 8 to 10, the segmented ring 43 is omitted. The screws 41 are thus engaged in orifices formed parallel to the axis of the part 2 through a flange 24 formed directly on the part 2 at the bottom end of its reinforced portion 21. The flange 24 thus comprises a top face 25 that receives the ends of the spring blades 32 and the heads of the screws 41, and a bottom face 23 against which the spring washers 42 exert their force.

Figure 12:
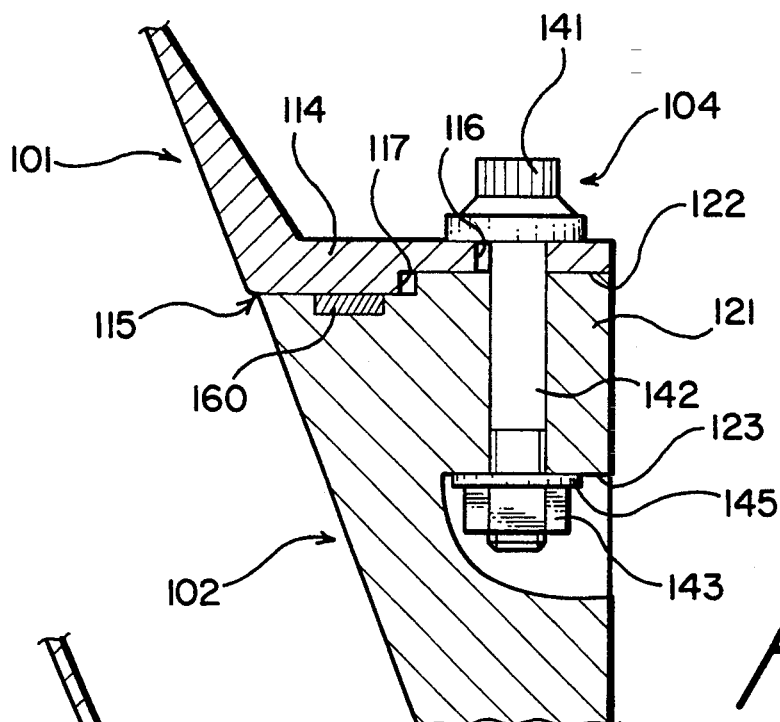
FIG. 12 is a half view in axial section showing a first example of a prior art joint assembly.
Figure 13:
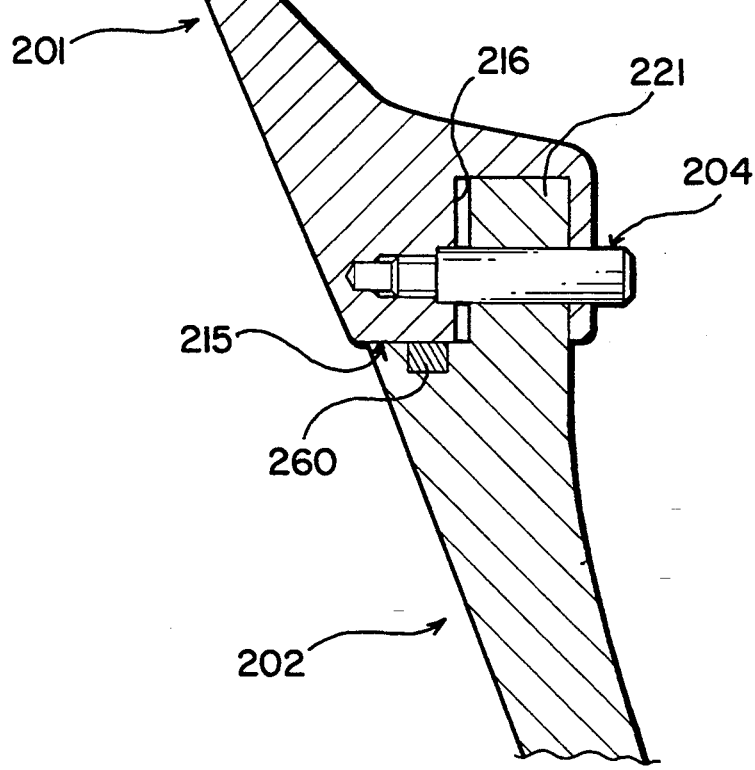
FIG. 13 is a half view in axial section showing a second example of a prior art joint device.

In the embodiment of FIGS. 8 to 10, the fastening of the part 1 to the part 2 is guaranteed to be implemented at the flange 24 which is vertically offset relative to the interface 15, said fastening being performed by the means 4 and by the spring blades 32 and without any sliding taking place at the screw-and-nut type fastening means 4. By using a vertical offset that is of sufficient size between the join plane between the parts 1 and 2 (interface 15) where sliding takes place and the bolted fastening 4 between the parts 1 and 2, and by using spring blades 31 that act radially, complete decoupling is obtained between the fastening flange 24 and the interface 15 that is used for radial sliding and for sealing. The drawbacks of prior art devices as described above, in particular with reference to FIG. 12, are therefore avoided.

Figure 11:
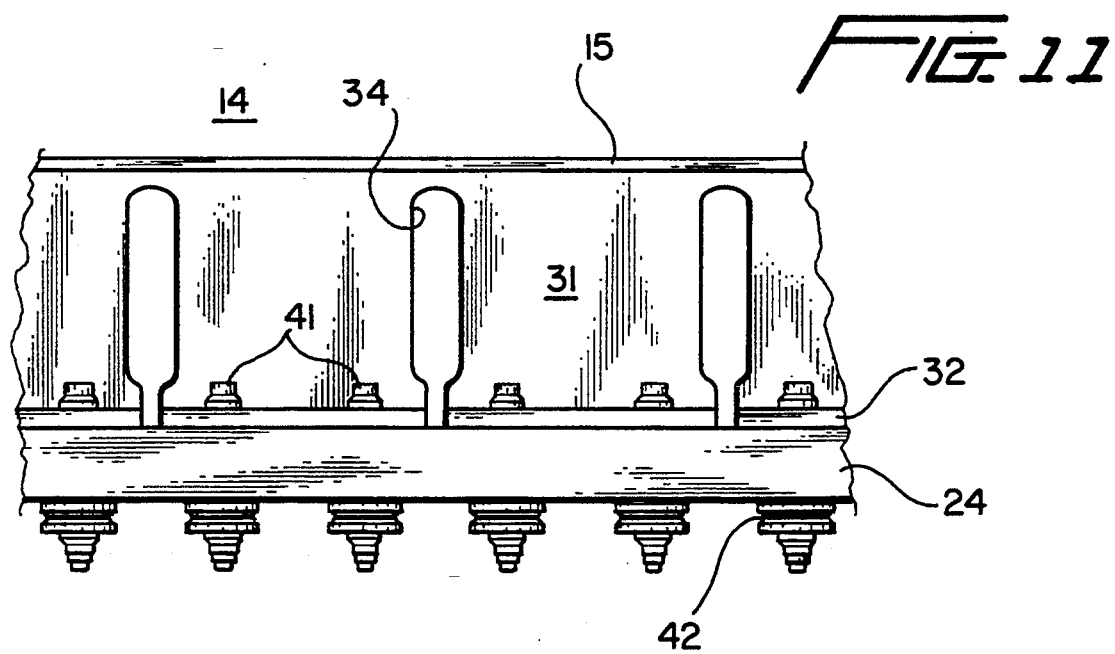
FIG. 11 is a view analogous to FIG. 9 and relates to a variant embodiment.

FIG. 11 which is a view analogous to FIGS. 5 and 9, merely shows a variant implementation of the flexible frustoconical skirt defining a succession of solid portions 31 forming the spring blades and of gap portions 34. In the example shown in FIG. 11, a plurality of screws 41 for fastening the bottom ends of the blades 31 are disposed between pairs of adjacent gaps 34, whereas in FIGS. 5 and 9, the gaps 34 are relatively close together and only one screw 45 is situated between two adjacent gaps 34. The shapes and the dimensions of the spring blades 31 and of the gaps 34, and similarly the number of screws 41 that are used, may naturally differ from the examples shown in the drawings, and may be adapted to different applications.

Although the joint assembly of the invention is particularly useful for use with circularly symmetrical parts of large diameter that are subject to large amounts of differential expansion, the joint assembly of the invention may also be applied to parts of different shapes that are subjected to large mechanical and thermal stresses.

We claim:

1. A sliding joint assembly comprising a first part and a second part that have different expansion coefficients and that are subject to large mechanical and thermal stresses, the assembly including at least one substantially radial contact interface which is located between the first and second parts, a sealing gasket disposed at said contact interface, mechanical fastening means between the first and second parts, and a plurality of radially acting spring blades each having first and second ends, said spring blades being connected firstly via said first ends thereof to the first part only in a vicinity of said contact interface, and secondly via said second ends thereof to the second part only in a zone that is axially remote from said contact interface, said contact interface constituting a sliding contact surface between the first and second parts, while the second ends of the spring blades are connected to the second part via said mechanical fastening means constituted by detachable screw-and-nut type assemblies provided with spring washers for damping forces exerted in an axial direction which is substantially perpendicular to said radial contact interface.

2. A sliding joint assembly according to claim 1, wherein the spring blades are connected to the first part via radial screw connections acting on flanges secured to the first part and formed perpendicularly to said contact interface.

3. A sliding joint assembly according to claim 1, wherein the spring blades are connected to the first part by weld fillets formed in a vicinity of said contact interface.

4. A sliding joint assembly according to claim 1, wherein the spring blades are integral with a portion of the first part that defines said contact interface.

5. A sliding joint assembly according to claim 1, wherein the spring blades are constituted by narrow individual blades leaving empty gaps between one another, the gaps being of width greater than the width of the spring blades.

6. A sliding joint assembly according to claim 1, wherein the spring blades are constituted by a single skirt that is split so as to form narrow empty gaps between the spring blades, the gaps being narrower than the spring blades.

7. A sliding joint assembly according to claim 1, wherein the detachable screw-and-nut type assemblies provided with said spring washers serve to connect the second ends of the spring blades to a segmented ring assembled together by means of radial pegs and made of a material that has an expansion coefficient close to that of the second part, and that bears against a bottom face of a flange formed on said second part.

8. A sliding joint assembly according to claim 1, wherein said detachable screw-and-nut type assemblies provided with said spring washers connect the second ends of the spring blades with a flange formed directly on the second part.

9. A sliding joint assembly according to claim 1, wherein said first and second parts are circularly symmetrical and superposed axially.

10. A sliding joint assembly according to claim 1, wherein said first part is made of metal and said second part is made of ceramic or composite material.

11. A sliding joint assembly according to claim 1, wherein said second part comprises a portion of an exit cone of a nozzle and said first part comprises a portion of a combustion changer of a rocket engine.

* * * * *